United States Patent
Oyama

[19]

[11] Patent Number: 6,161,935
[45] Date of Patent: Dec. 19, 2000

[54] LIGHTING DEVICES FOR CONTROLLED DISTRIBUTION AND FOR PANEL RADIATION

[75] Inventor: Nobuo Oyama, Tokyo, Japan

[73] Assignee: K.K. S.T.I. Japan, Tokyo, Japan

[21] Appl. No.: 08/957,441

[22] Filed: Oct. 24, 1997

[51] Int. Cl.[7] ....................................................... F21V 7/04
[52] U.S. Cl. ............................ 362/31; 362/299; 362/300; 362/301
[58] Field of Search ................................ 362/32, 303, 332, 362/330, 311, 360, 326, 31, 341, 347–349, 355, 257, 296–301, 304–307; 345/40; 385/146; 359/49, 48, 15

[56] References Cited

U.S. PATENT DOCUMENTS

| | | | |
|---|---|---|---|
| 5,278,731 | 1/1994 | Davenport et al. . | |
| 5,303,322 | 4/1994 | Winston et al. | 385/146 |
| 5,618,102 | 4/1997 | Ferrell . | |
| 5,810,469 | 9/1998 | Weinreich | 362/298 |

FOREIGN PATENT DOCUMENTS

| | | |
|---|---|---|
| 0501669 | 9/1992 | European Pat. Off. . |
| 3929920 | 3/1991 | Germany . |
| 9215029 | 12/1992 | Germany . |
| 9420871 | 9/1994 | WIPO . |

*Primary Examiner*—Sandra O'Shea
*Assistant Examiner*—Ismael Negron
*Attorney, Agent, or Firm*—Rothwell, Figg, Ernst & Manbeck, P.C.

[57] ABSTRACT

A lighting device of a controlled distribution type provides a high energy efficiency and desired distribution of light. Such lighting device is obtained by redirecting and condensing the flux of a lamp 1 with an ellipsoidal reflector 2 alone or together with a spheric reflector 3, further redirecting visible or infrared rays in the flux to have visible rays entered to a transparent diffuser 5 which embodies a plurality of ridges or ridges and grooves and diffuses incident light in single axis and further controlling such diffused rays with a reflector or a set of reflectors 6.

Such lighting device is used to constitute another lighting device in a radiation panel type.

15 Claims, 5 Drawing Sheets

$d \leq \dfrac{P}{4}$ $d \leq \dfrac{P}{4}$ $d \leq \dfrac{P}{4}$ $d \leq \dfrac{P}{4}$

LIGHTING DEVICES FOR CONTROLLED DISTRIBUTION AND FOR PANEL RADIATION

FIELD OF THE INVENTION

The present invention relates in general to lighting devices for controlled distribution of light or for uniform radiation through the panels of such lighting devices.

BACKGROUND OF THE INVENTION

The conventional methods of controlling distribution of light of a lamp are to redirect or control flux of a light source with a reflector or a lens, or to cut a part of flux with an absorption body in order to eliminate the light which goes to outside of the desired area. However, the elimination of a part of the flux of a lamp for such an improvement has resulted in a low energy efficiency. Many of the conventional lighting devices for uniform radiation through the panels of such lighting devices have a plurality of fluorescent lamps behind each of the translucent diffusion panels and radiate the flux of lamps out through each of the diffusion panels.

Such devices have failed to have sufficiently uniform light intensity throughout the radiation panel due to cause of light and dark bands on the surface of the radiation panel along the arrangement of the fluorescent lamps. Elimination of such light and dark bands by arranging the lamps closer to one another or by using a high diffusion panel of conventional translucent material for the radiation panel decreases the energy efficiency.

It is an objective of the present invention to provide a lighting device in a distribution control type which forwards much greater amount of the flux from a lamp (lamps) into a specified range of light distribution and much less amount of the flux to the outside of the range than any conventional device does, i.e. a lighting device in a distribution control type which provides a desired light distribution with a high energy efficiency.

It is further objective of the present invention to provide a lighting device in a radiation panel type with no cause of light and dark bands on the radiation panel, i.e. uniform radiation throughout the panel with a high energy efficiency in exploitation of the above light distribution control technology.

SUMMARY OF THE INVENTION

A lighting device in a controlled distribution type in regard to the present invention comprises an artificial light source, a means to redirect the flux of the light source and a light diffuser which diffuses such redirected flux in specific directions, wherein the diffuser has a transparent or reflective body comprising a plurality of ridges or ridges and grooves arranged, whereby redirected flux of light incident to a face of the arrangement is diffused.

The redirection of the flux of the light source may be made with a reflector which provides the flux of the light source in specific beam angle. Optical fibers or a light guide pipe may transmit such beam of flux to the diffuser at a distant place. A higher energy efficiency can be obtained by further redirecting a part of diffused rays which were to be directed to outside of a desired range of light distribution, into the desired range with an additional reflector.

A lighting device in a radiation panel type in regard to the present invention comprises a pair of optical component parts having optically smooth faces which are facing each other in distances varying in traveling from one end to the opposite end of the optical component parts, wherein at least one of the said component parts is transparent, and one or a plurality of light sources so placed at one end or both the opposit ends of the said component parts that the flux of the light source(s) enters between the said faces and radiates out through the transparent component part.

A lighting device in a controlled distribution type in regard to the present invention may be used for the light source of the above lighting device in a radiation panel type as well as a fluorescent lamp with a reflector which redirects its flux between the said faces.

DETAILED DESCRIPTION OF THE INVENTION

Figure 1:
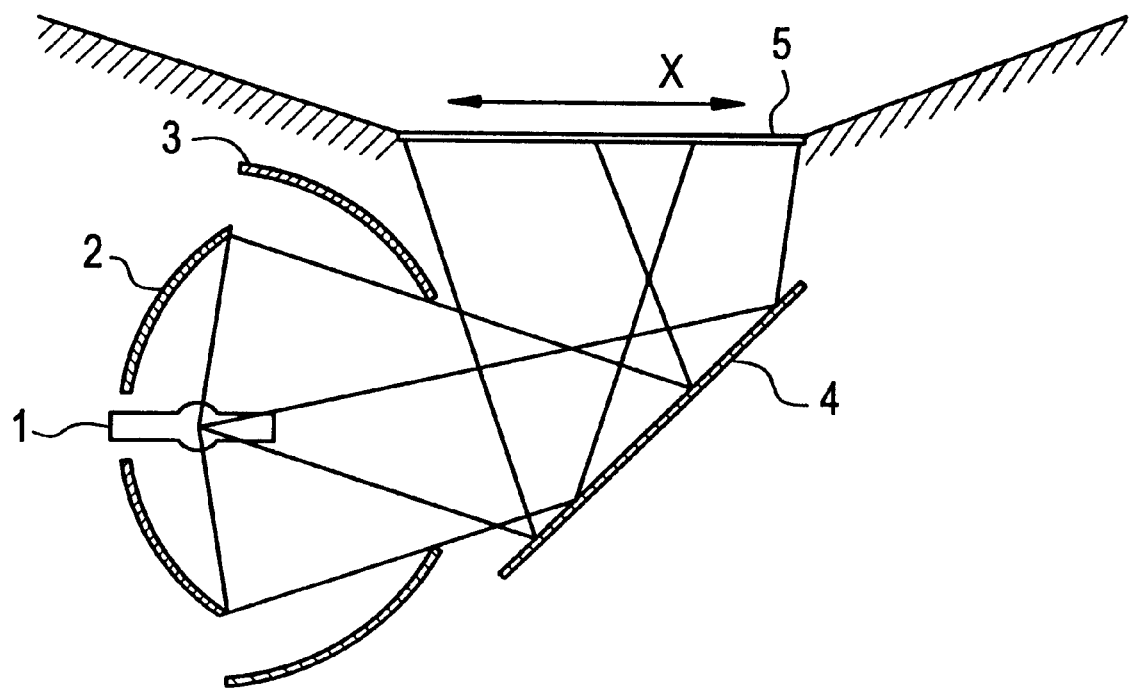
FIG. 1 is a schematic view of a structure of a lighting device in a controlled distribution type in regard to the present invention.
Figure 2:
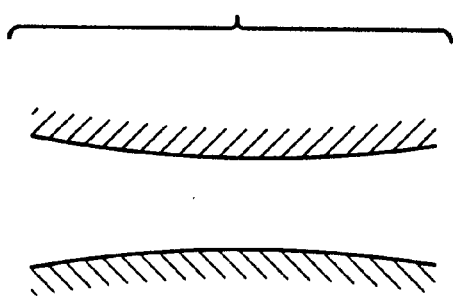
FIG. 2 is a schematic presentations of a light distribution obtained with the lighting device described in FIG. 1.

FIG. 1 shows that the flux of a 35 watt short-arc metal-halide lamp 1 is collected and redirected into a condensed beam with an ellipsoidal reflector 2 and a spherical reflector 3, and partially further redirected the beam with a flat reflector 4 to a transparent diffusion body 5 which has a "diffusion axis X". All the said reflectors are made by making specific optical coating on their glass bodies so that they reflect visible rays, transmit infrared rays and consequently eliminate most of infrared rays from the beam insident to the diffuser 5. The ellipsoidal reflector 2 alone or together with the spherical reflector 3 constitutes the first means to redirect the flux, and the flat reflector 4 constitutes the second means for the redirection in regard to the present invention. Projection of the diffused rays from the diffuser 5 to a wall provides a light distribution as shown in FIG. 2.

Figures 1, 3A:
Figures 2, 3A:
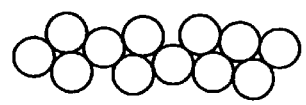
Figures 3, 3A:
FIG. 3 is cross-sectional schematic views of the diffuser in FIG. 1 in variation, wherein "C" or a single solid line represents a circle, a circular arc or a curve, and a double solid line represents a straight line.
Figures 1, 3B:
Figures 2, 3B:
Figures 3, 3B:
Figures 1, 3C:
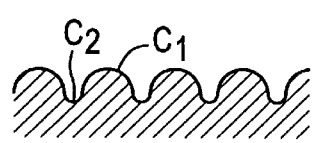
Figures 2, 3C:
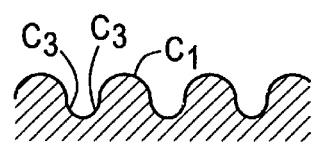
Figures 3, 3C:
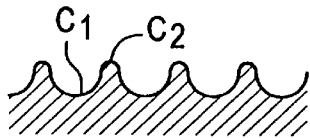

The diffuser 5 is a transparent acrylic plate which embodies a plurality of ridges next to one another on a face of the said plate, wherein each of the ridges has cross-sectional shape of a circular arc. The diffuser 5 may also be a transparent plate embodying an arrangement of a plurality of either ridges or ridges and grooves each of which has a cross-sectional shape that is partially circular, elliptic, sine curved or curved in any other way as shown in FIG. 3. The diffuser 5 may also be either a transparent or a reflective body of plurality of mono-filaments or cylinders bundled together.

Optical fibers or a light guide pipe may received the flux condensed by the ellipsoidal reflector 2 alone or with the spherical reflector 3, directly from the ellipsoidal reflector 2 or through the flat reflector 4, in order to transmit the flux to the diffuser 5 at a distant place. Projection of the diffused rays to a wall with the flux thus redirected and transfered provides a light distribution similar to one shown in FIG. 2.

Figures 3, 3C, 4:
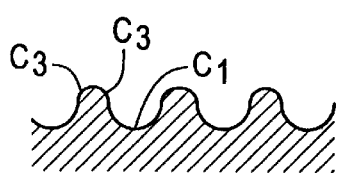
FIG. 4 is a schematic view of the structure of a lighting device in a controlled distribution type in regard to the present invention using a set of reflectors to further control diffused rays.
Figures 1, 3D:
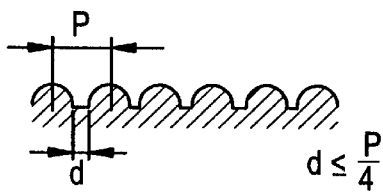
Figures 2, 3D:
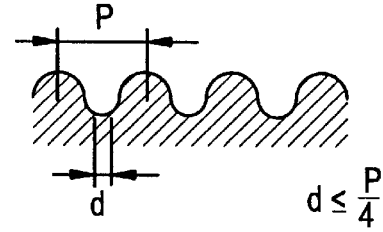
Figures 3, 3D:
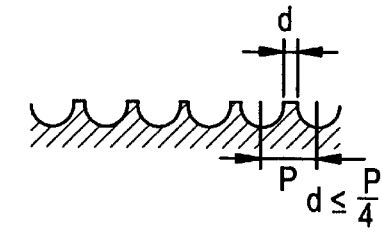
Figures 3, 3D, 4:
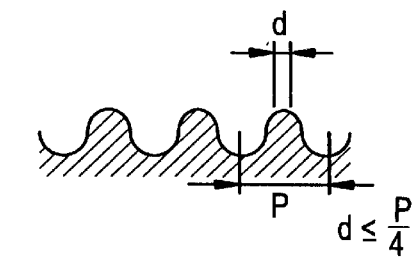
Figure 4:
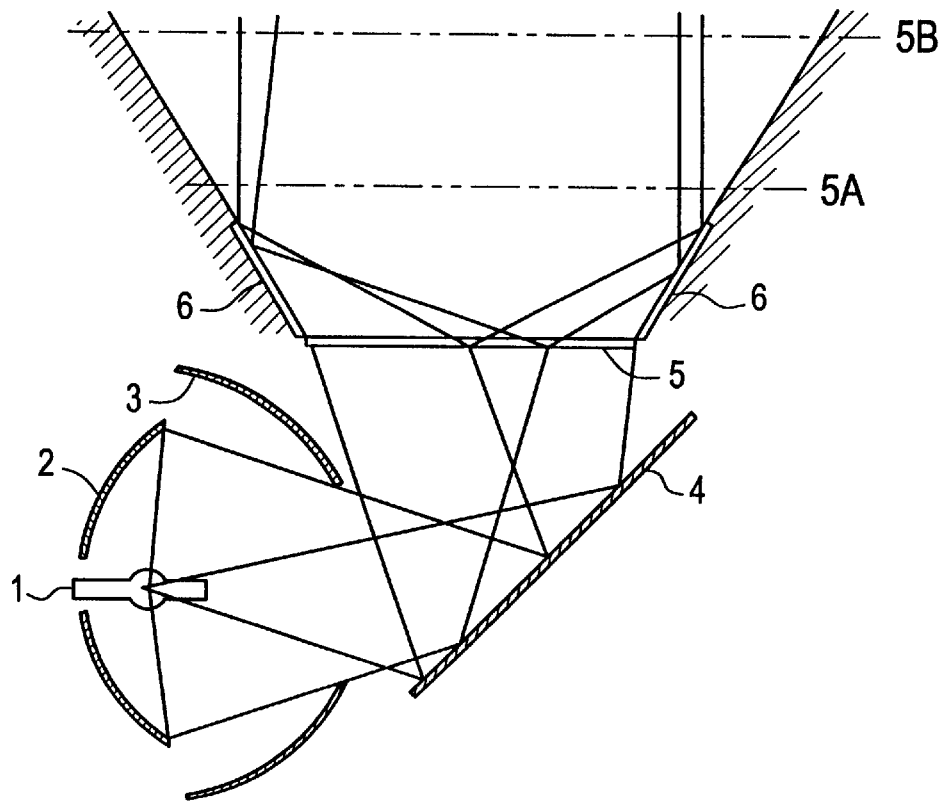
Figure 5A:
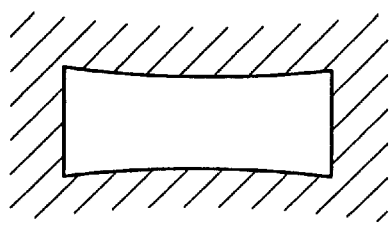
FIG. 5 is schematic presentations of a light distribution obtained with the lighting device described in FIG. 4, wherein "(a)" represents the light distribution in the cross-section at Line A, and "(b)" represents the same at Line B.
Figure 5B:
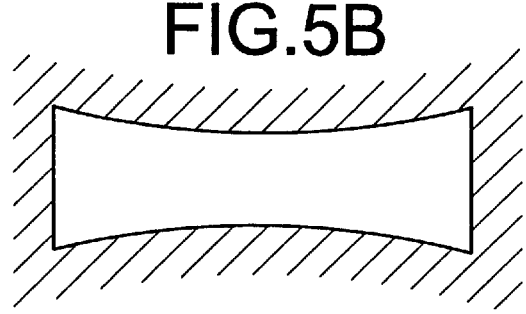

As shown in FIG. 4, a set of flat reflector 6 is so placed in front of the diffuser 5 that such set of reflectors controls the direction of the diffused rays. Projection of the flux of such controlled diffused rays to a wall at distance A and B are shown in FIG 5—(a) and (b). The shapes of the light distribution at distance A and B represent the cross-sectional shapes of the flux at distance A and B. This implies that the diffusion from the diffuser 5 is controlled into a shape of a frustum of pyramid which expands forwards.

Figure 7:
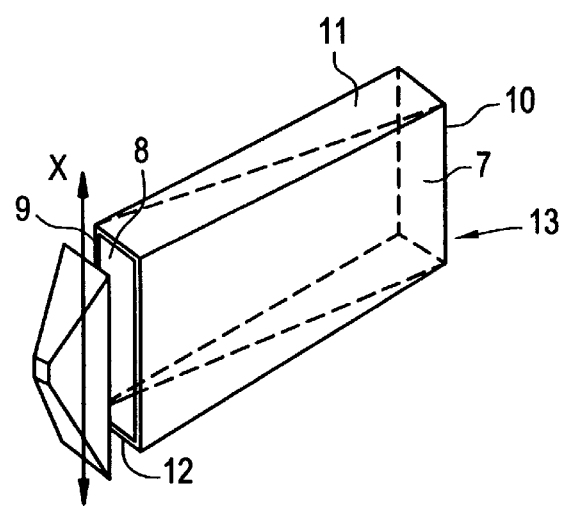
FIG. 7 is a perspective view of a lighting device in a radiation panel type in regard to the present invention, wherein the distance between the face of the radiation panel and the face of the reflection panel gradually decreases in traveling from the light entering end to the opposite end.

FIG. 7 shows a thin box having thickness of 15 cm, height of 50 cm and width of 100 cm is used as the radiation panel 7, and a 3 mm thick acrylic reflection panel 8 is placed behind the radiation panel 7, keeping the reflective surface faced to the radiation panel 7. The distance between the said panels is set to be 13.7 cm at end a of the box and gradually decreased towards the opposite end 10, in a straight line. Reflection panels 11 and 12 are placed at both the longer ends, keeping the reflective faces inside.

Figure 6:
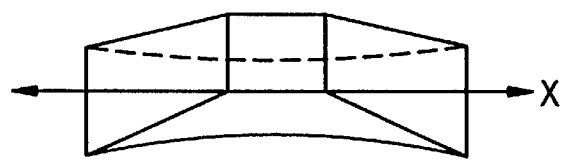
FIG. 6 is a perspective view of flux obtained with the lighting device described in FIG. 4.
Figure 8:
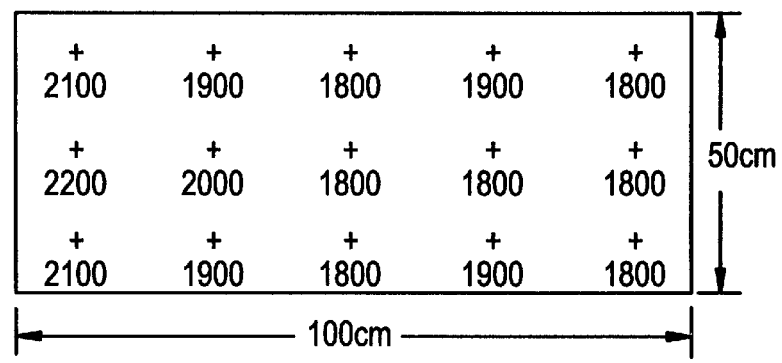
FIG. 8 is a presentation of the distribution of light intensities obtained on the radiation panel of the lighting device described in FIG. 7, wherein a conventional acrylic translucent diffusion panel is used as the radiation panel.

Flux of light which has a shape of a frustrum of pyramid as shown in FIG. 6, enters between the radiation panel 7 and reflection panel 8 at the end 9 of thus structured optical component 13. The distribution of the light intensities on the surface of the radiation panel 7 is shown in FIG. 8. Each number on the radiation panel shows the intensity in lux at each point where such number is shown. The result implies the following:

Average intensity: 1873 lux $$\text{Uniformity}\left(\frac{\text{Max. intensity}}{\text{Min. intensity}}\right): \frac{2200}{1700} = 1.3$$

$$\text{Efficiency}\left(\frac{\text{Total flux radiated}}{\text{Total flux radiated}}\right): \frac{1873 \times 0.5}{2700} \approx 0.34$$

Figure 9:
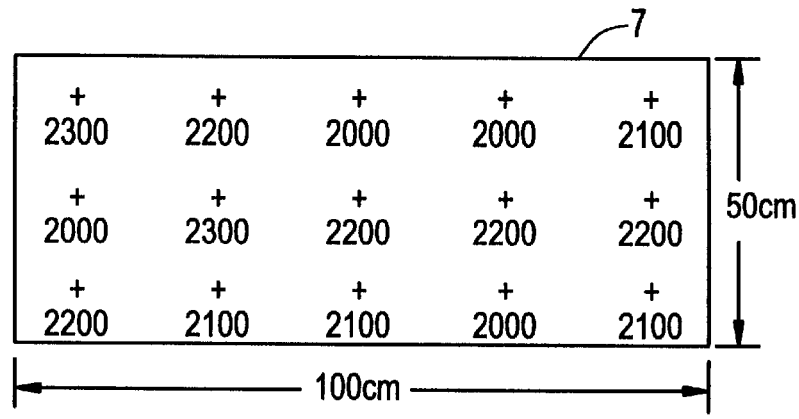
FIG. 9 is a presentation of the distribution of light intensities obtained on the radiation panel of the lighting device described in FIG. 7, wherein a diffuser described in FIG. 3 is used as the radiation panel.

In the above optical component 13, the translucent radiation panel 7 is replaced with a transparent diffusion panel which has the structure the same to the diffuser 5. The diffusion panel is so placed that its ridges face outside and is orthogonal to the longitudinal axis of the optical component 13. Light intensities on the radiation panel 7 made of such diffusion panel is shown in FIG. 9. The result implies the following:

Average intensity: 2173 lux $$\text{Uniformity}\left(\frac{\text{Max. intensity}}{\text{Min. intensity}}\right): \frac{2500}{2000} = 1.25$$

$$\text{Efficiency}\left(\frac{\text{Total flux radiated}}{\text{Total flux radiated}}\right): \frac{1086 \times 0.5}{2700} \approx 0.4$$

Figure 10:
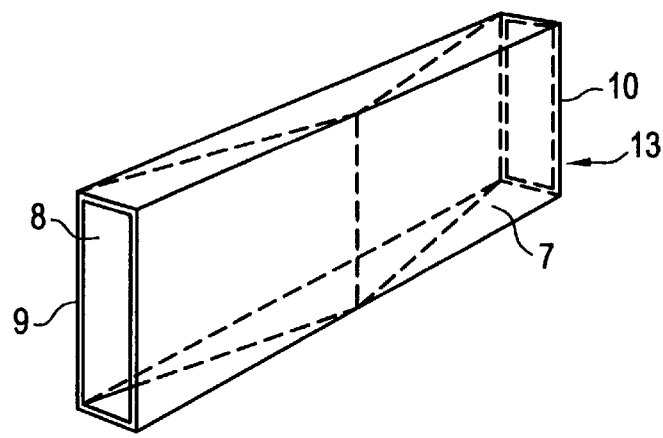
FIG. 10 is a perspective view of the structure of a lighting device in a radiation panel type, wherein the distance between the face of the radiation panel and the face of the reflection panel gradually decreases towards the middle line of the radiation panel, and light enters from both the opposite ends of the optical component.
Figure 11:
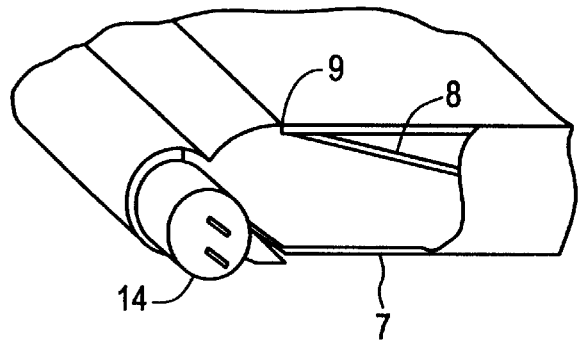
FIG. 11 is a perspective partial view of the lighting device described in FIG. 10, wherein fluorescent lamps are used as the light sources.

FIG. 10 shows the optical component 13, wherein the distance between the radiation panel 7 and the reflection panel 8 gradually decreases in traveling from both the said opposite ends 9 and 10 to the middle line of such two ends. Flux of a fluorescent lamp 14 enters between the said panels at each of the said opposite ends 9 and 10.

In any of the above lighting devices in a radiation panel type, an increase of the distance between the said panels 7 and 8 towards the opposite end or the middle line for a short distance from each light entering end improves the uniformity of the radiation over the surface of the radiation panel 7.

What is claimed is:

1. A lighting device for a controlled distribution of light, comprising:
   a light source,
   a flat reflector positioned in front of said light source and angled to redirect flux from said light source;
   an ellipsoidal reflector positioned behind the light source and positioned to reflect light toward said flat reflector; and
   a diffuser which diffuses such redirected flux into specific directions, wherein the diffuser is a transparent or reflective body embodying a plurality of ridges or ridges and grooves arranged, wherein each of the ridges in the arrangement of ridges, or at least each of either ridges or grooves in the arrangement of ridges and grooves has a cross-sectional shape that is partially circular, elliptic, sine curved or curved in other way, whereby redirected flux incident to either face of the diffuser is diffused in specific direction.

2. The device of claim 1, wherein the said transparent or reflective body has a planar or panel-like shape and a plurality of ridges or ride and grooves is formed substantially parallel to one another at least on one of the faces of such transparent body or on the reflective surface of such reflective body.

3. The device of claim 1, wherein the said transparent or reflective body comprises a plurality of mono-filaments or cylinders arranged next to one another or bundled together.

4. The device of claim 1, further including a spherical reflector positioned between said light source and said flat reflector, and having an aperture which is aligned with said light source and said flat reflector, said spherical reflector being positioned to interrupt a portion of said flux to control the range of the distribution of diffused rays which is made with the said diffuser.

5. The device of claim 1, wherein the said means to redirect the flux is a reflector or a set of reflectors which collects and condenses the flux of the said light source into a specified beam angle.

6. The device of claim 5, wherein a set of optical fibers or a light guide pipe transmit(s) the flux condensed to the said diffuser.

7. The device of claim 5, which has a second reflector to further redirect all or a part of the beam which is with the above reflector or set of reflectors, to the said diffuser.

8. The device of claim 7 wherein a set of optical fibers or a light guide pipe transmits the further redirected flux to the said diffuser.

9. A lighting device in a radiation panel type, comprising:

a substantially rectangular enclosure;

a pair of substantially planar optical component parts within said enclosure and having optically smooth faces which are facing each other in distances varying gradually in traveling from one end to an opposite end of the pair of optical component parts, wherein one of the optical component parts is transparent and the other is reflective, and a light source apparatus to enter light between the said faces at an end of the said optical component parts and said enclosure, whereby the entered light reflects off of said reflective optical component part and radiates out through the transparent optical component part.

10. The device of claim 9, wherein the distance between the said faces of the optical component parts gradually decreases in traveling from one end to the opposite end of the said optical component parts.

11. The device of claim 9, wherein the distance between the said faces gradually decreases in traveling from both the said opposite ends to a middle line of the said two ends.

12. The device of claim 9, wherein the distance between the said faces increases towards the opposite end or a middle line of the said two ends for a short distance from each light entering end.

13. The device of claim 9, wherein said light source apparatus further comprises:

a light source;

a flat reflector positioned in front of said light source and angled to redirect flux from said light source;

an ellipsoidal reflector positioned behind the light source and positioned to reflect light toward said flat reflector; and a diffuser which diffuses such redirected flux into specific directions, wherein the diffuser is a transparent or reflective body embodying a plurality of ridges or ridges and grooves arranged, wherein each of the ridges in the arrangement of ridges, or at least each of either ridges or grooves in the arrangement of ridges and grooves has a cross-sectional shape that is partially circular, elliptic, sine curved or curved in other way, whereby redirected flux incident to either face of the diffuser is diffused in specific directions.

14. The device of claim 9, wherein a fluorescent lamp is used as the said light source.

15. The device of claim 9 wherein the distance between the said faces increases toward the opposite end or a middle line of the said two ends for a short distance from each light entering end and the decrease of the distance occurs succeeding to such increase of the distance.

* * * * *